Oct. 25, 1932.    M. JACKWIRTH    1,883,928
ELECTRICAL REGULATING SYSTEM
Filed Aug. 17, 1931
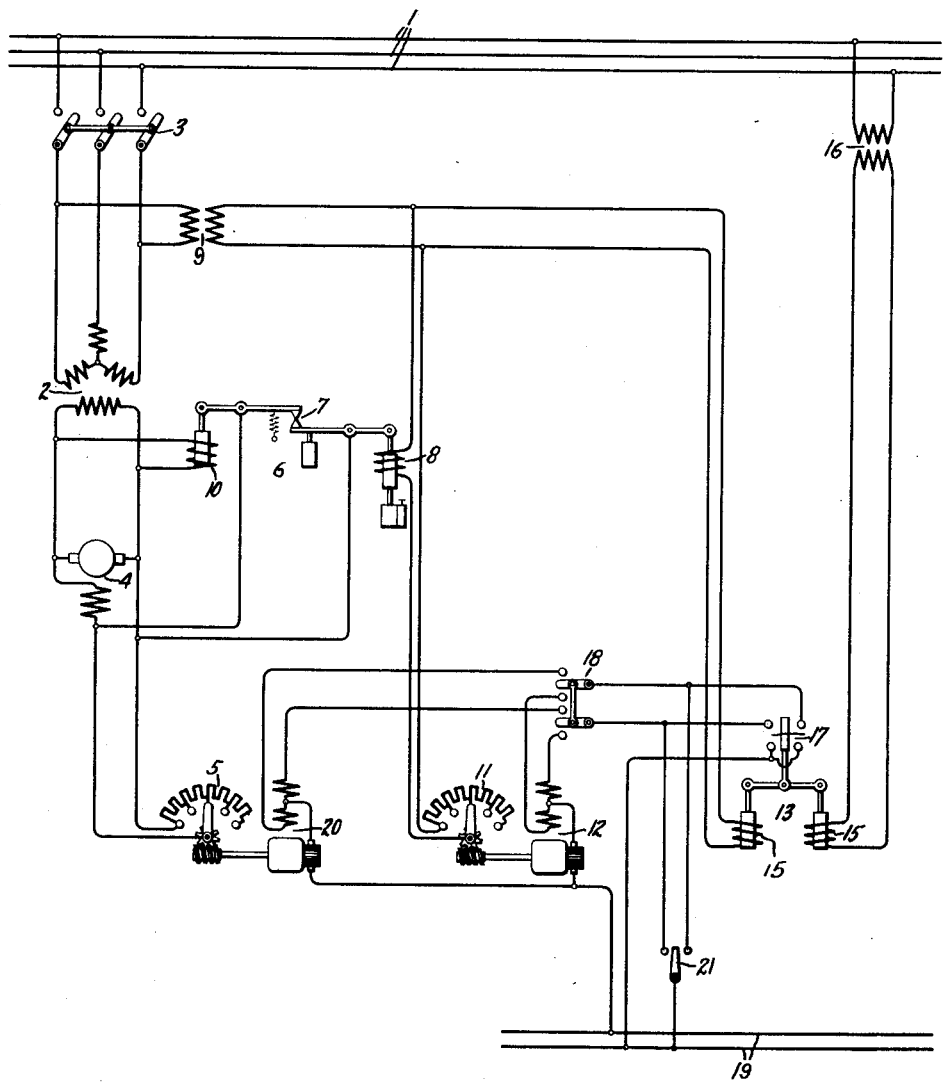
Inventor:
Maximilian Jackwirth,
by Charles E. Tullar
His Attorney.

Patented Oct. 25, 1932

1,883,928

UNITED STATES PATENT OFFICE

MAXIMILIAN JACKWIRTH, OF BERLIN-PANKOW, GERMANY, ASSIGNOR TO GENERAL ELECTRIC COMPANY, A CORPORATION OF NEW YORK

ELECTRICAL REGULATING SYSTEM

Application filed August 17, 1931, Serial No. 557,673, and in Germany September 4, 1930.

My invention relates to electrical regulating systems and more particularly to an automatic system for equalizing the voltages of a main circuit and a generator before connecting the generator to the circuit.

Before connecting an electrical generator to a circuit, or bus, to which other generators are already connected it is necessary that the voltages of the incoming generator and the bus should be equalized so as to prevent a too great interchange of power between the incoming generator and the bus, which in some cases would cause dangerous overloading of the incoming generator, not to mention an undesirable voltage disturbance on the bus. In most systems where the generator, or generators, to be paralleled with the main bus are of large size they are provided with automatic voltage regulators which act to maintain substantially constant terminal voltage on their associated machines under varying conditions of load with the result that the voltage of the main bus is maintained substantially constant.

In accordance with my invention I provide relatively simple means for comparing the voltages of the incoming generator and the bus and cause this means to vary the voltage calibration of the voltage regulator of the incoming machine in a manner to cause the regulator to equalize the voltage of the incoming machine with the voltage of the main bus.

At this point I wish to call attention to the fact that although my invention finds its greatest application to voltage regulating systems it should be understood that my invention is not necessarily limited to such systems and it will be obvious to those skilled in the art, as the description of my invention proceeds, that I might connect my voltage comparing means and/or the regulator to respond to any one or more of the operating conditions of the generator and/or the main bus without departing from my invention in its broader aspects.

It is an object of my invention to provide a new and improved electrical regulating system.

Another object of my invention is to provide a novel and simple system for automatically bringing the voltage of an incoming generator into equality with the voltage of a circuit to which the generator is to be connected.

My invention will be better understood from the following description taken in connection with the accompanying drawing and its scope will be pointed out in the appended claims.

Referring now to the single figure of the accompanying drawing, wherein I have illustrated diagrammatically an embodiment of my invention and in which 1 is a main bus, or circuit, to which a generator 2 is to be connected by means of any suitable connecting device, such as a switch 3. I have illustrated the bus 1 and generator 2 as elements of a three-phase alternating current system but my invention may be applied to a system of any number of phases, or to a direct current system, without departing from my invention in its broader aspects. Generator 2 is preferably, but not necessarily, provided with an exciter 4 and this exciter has a field rheostat, or resistance, 5 whose effective value is varied in order to secure regulation of generator 2.

The voltage regulator for generator 2 may be any one of a number of well known types and in the illustrated embodiment I have shown it as a vibratory contact Tirrill type regulator 6. This regulator, which is well known in the art, is provided with a pair of relatively vibratory contacts 7 which are connected so as to be able to short circuit resistance 5 and which, through variations in the ratio of their time of engagement to their time of disengagement, control the effective value of resistance 5 and consequently the voltage of generator 2. Contacts 7 are controlled in the usual manner by a main control magnet 8 connected to be responsive to the voltage of generator 2, preferably through a potential transformer 9, and an antihunting coil 10 which is connected to be responsive to the exciter voltage. It should be understood that in ordinary practice a relay is interposed between the contacts 7 and the resistance 5 but as this relay has no effect on the principles of operation of my invention it has been omitted for the sake of simplicity. The operation of regulator 6, which is well understood by those skilled in the art, results from the joint action of magnets 10 and 8 which control respectively, the vibratory action of the contacts and the ratio of their time of engagement to their time of disengagement.

A resistance 11 is connected in series with the main control coil 8 of the voltage regulator and by varying the value of this resistance the voltage calibration of the regulator will be varied. Thus, if the value of resistance 11 is increased it will reduce the current in coil 8 with the result that the regulator will tend to hold a higher voltage while if resistance 11 is decreased the regulator will tend to hold a lower voltage. Operating means which is illustrated, by way of example, as a reversible pilot motor 12 is provided for varying the value of resistance 11 and the direction of operation of this motor is controlled by a voltage responsive arrangement in the form of a voltage comparing relay 13. This relay may be any type of differential relay and in the illustrated embodiment it is shown as of the balance type having a magnet 14 which is connected to be responsive to the voltage of generator 2, by also connecting it to potential transformer 9, and a coil 15 connected to be responsive to the voltage of bus 1, preferably through a potential transformer 16. Relay 13 is so arranged that when the voltage of bus 1 and generator 2 are equal it will be balanced while when these voltages become unequal the pull of the coil connected to respond to the highest voltage will predominate and thereby cause an unbalancing of the relay. This relay is provided with a set of contacts 17 for controlling reversing connections for motor 12 in accordance with the relation between the voltage of generator 2 and the voltage of bus 1. The operating connections for motor 12 are completed through contacts 17, a selective manually controlled switch 18, and a suitable source of current supply, such as a supply bus 19.

The purpose of switch 18 is to disconnect control contacts 17 from motor 12 and at the same time connect these contacts to control the direction of operation of an operating motor 20, which is similar to motor 12 and which is connected to vary the value of field resistance 5. In this manner when switch 18 is in its upper position the voltage comparing relay 13 controls the voltage of machine 2 directly, by varying the resistance of its exciter field circuit instead of varying the calibration of voltage regulator 6.

If desired a suitable relay or relays may be interposed between switch 18 and contacts 17 so as to relieve the duty on these contacts.

It is sometimes desirable to equalize the voltages of bus 1 and machine 2 manually and consequently I provide a suitable double throw manual switch 21 which is connected to control the operating connections of motors 12 and 20.

The operation of the illustrated embodiment of my invention is as follows: Assume that bus 1 is energized by any suitable source of current supply (not shown) and that its voltage is at its normal rated value. Assume also that switches 3 and 21 are open and that switch 18 is in its lowermost position. Assume further that generator 2 is being driven by any suitable prime mover (not shown) and that the voltage of generator 2 is below normal, that is to say, below the voltage of bus 1. Under the above assumed conditions the pull of coil 15 will overcome the pull of coil 14 of relay 13 with the result that this relay is unbalanced and its right-hand contacts will be bridged. This completes an energizing circuit for motor 12 and this circuit is so selected that motor 12 acts to cause an increase in the value of resistance 11. The result will be that the current in coil 8 will decrease, thereby causing regulator 6 to increase the voltage of generator 2. This action will continue until the voltage of generator 2 is brought up to the same value as the voltage of bus 1. As soon as this equalization takes place the relay 13 will become balanced and motor 12 will become deenergized. Switch 3 may now be closed, thereby paralleling bus 1 and generator 2. In a similar manner if the voltage of generator 2 is above the voltage of bus 1 relay 13 will be unbalanced in the opposite direction, thereby causing a reverse operation of motor 12 with the result that resistance 11 is decreased, thereby increasing the energization of coil 8 which so changes the calibration of regulator 6 that it causes generator 2 to hold a lower voltage. This action will continue until the voltages are equalized when relay 13 will become balanced.

If the regulator 6 should be out of order or if for any other reason it is desirable to vary the voltage of generator 2 directly instead of by means of the regulator, switch 18 may be moved to its upper position. Under these circumstances relay 13 controls directly the value of the resistance 5 and consequently controls directly the voltage of generator 2. Thus, if the voltage of generator 2 is below that of bus 1, relay 13 will become unbalanced and motor 20 will be operated in a manner to decrease the value of resistance 5, thereby increasing the excitation and voltage of exciter 4 and consequently the excitation and voltage of machine 2. Similarly if the voltage of generator 2 is high, relay 13 will cause reversal of motor 20 thereby causing an increase in the value of resistance 5 and a decrease in the voltage of machine 2.

By manipulating switch 21 it will be obvious that motors 12 or 20 may be controlled manually depending upon the position of switch 18. In this manner manual control is provided and due to the fact that this control is electrical the manual control may be made from a remote point.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. In combination, a main circuit, a generator adapted to be connected in energy transmitting relation to said circuit, an automatic regulator of an operating condition of said generator, and means responsive to a function of an electrical condition of both said circuit and said generator for modifying the action of said regulator.

2. In combination, a main bus, a generator, means for connecting said generator to said bus, an automatic voltage regulator for said generator, and means responsive to the voltages of said bus and said generator for varying the calibration of said regulator.

3. In combination, a main bus, a generator, means for connecting said bus to said generator, an automatic voltage regulator for said generator, and means responsive to the difference between the voltages of said bus and said generator for changing the calibration of said regulator in a manner to cause equalization of said voltages.

4. In combination, a main bus, a generator, means for connecting said generator to said bus, an automatic voltage regulator for said generator having a voltage coil connected to respond to the voltage of said generator, a variable resistance in series with said coil, and a differential relay connected to vary the value of said resistance in accordance with the difference between the voltages of said bus and said generator.

5. In combination, a main bus, a generator, means for connecting said generator to said bus, an automatic voltage regulator for said generator, additional means for varying the voltage of said generator, a voltage comparing relay connected to said bus and said generator, and means for selectively putting said regulator or said additional means under the control of said relay.

6. In combination, a main bus, a generator, means for connecting said generator to said bus, an automatic voltage regulator for said generator, means responsive to the difference between the voltages of said bus and said generator for changing the calibration of said regulator in a manner to cause equalization of said voltages, and manually controlled means for controlling the calibration of said regulator.

7. In combination, a three phase alternating current bus, a three phase alternating current generator, a switch for connecting said generator to said bus, a vibratory contact type voltage regulator for said generator, a variable resistance connected to vary the calibration of said regulator, and a voltage comparing differential relay connected to vary said resistance in accordance with a difference between the voltages of said bus and said generator.

In witness whereof, I have hereunto set my hand.

MAXIMILIAN JACKWIRTH.